April 22, 1958 C. H. McADIE 2,832,026
A. C. LOAD CONTROL WITH TWO CONTROL TUBES
Filed Feb. 8, 1954

WITNESSES

INVENTOR
Colin H. McAdie
BY
Paul E. Friedemann
ATTORNEY

2,832,026
A. C. LOAD CONTROL WITH TWO CONTROL TUBES

Colin H. McAdie, Baltimore, Md., assignor to Westinghouse Electric Corporation, East Pittsburgh, Pa., a corporation of Pennsylvania Application February 8, 1954, Serial No. 408,882

2 Claims. (Cl. 318—356)

This invention relates to circuits for supplying a direct current to a highly inductive load, as the field windings of a direct current motor, from an alternating current source.

In one embodiment of this invention, the anode and cathode of a grid-controlled vacuum tube are connected across an A. C. source and across the field winding of a D. C. motor. When A. C. is first applied to the grid of the tube when its anode is negative, a small A. C. current will flow through the field winding, its value depending upon the inductive reactance of the winding. When the A. C. voltage reverses and makes the anode of the tube positive, the tube will conduct but it will also carry the field current which was started flowing towards the anode by the previous half-cycle of voltage. The field current will increase on successive half-cycles until further increase is prevented by the tube resistance as determined by its grid voltage. After the field current has increased to the value set by the grid voltage, it can be varied by varying the grid voltage.

In another embodiment of this invention, a second vacuum tube is added to the circuit described in the foregoing, with its anode connected to the cathode of the other tube, and its cathode connected to the anode of the other tube. This additional tube, when the other tube is cut off, can supply field current opposite in direction to that supplied by the other tube, thereby providing for reversal of the motor.

An object of this invention is to use a single vacuum tube to supply steady state direct current to the field winding of a direct current motor, from an alternating current source.

Another object of this invention is to use a single vacuum tube to supply steady state direct current to the field winding of a direct current motor, from an alternating current source, and to control the value of the field current by control of the grid voltage of the tube.

Another object of this invention is to use a pair of reversely connected vacuum tubes for energizing the field winding of a direct current motor from an alternating current source, and to cause the motor to rotate in one direction by cutting off one of the tubes while permitting the other tube to conduct, and to cause the motor to rotate in the other direction by cutting off the other tube while permitting the one tube to conduct.

This invention will now be described with reference to the drawing, of which:

Figure 1:
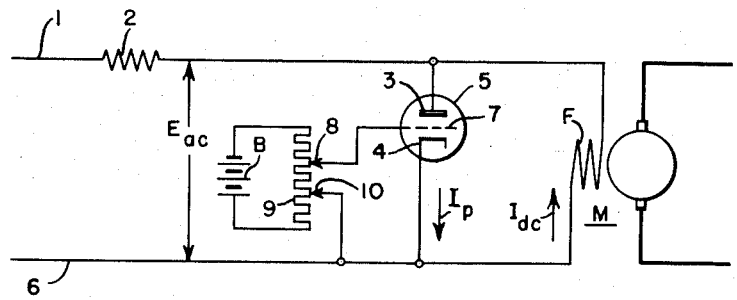
Figure 1 is a diagrammatic showing of one embodiment of the invention.

Referring first to Fig. 1, a D. C. motor M has a field winding F to the opposite ends of which are connected the anode 3 and cathode 4, respectively, of the vacuum tube 5, and the A. C. line conductors 1 and 6. The control grid 7 of the tube is connected to the adjustable tap or brush 8 of the potentiometer 9 which is connected across the bias battery B, and which has an intermediate tap 10 connected to the cathode 4 of the tube.

In the operation of the circuit of Fig. 1, when A. C. voltage is first applied in a direction that the anode 3 of the tube 5 is negative, the tube 5 will not conduct, but a small alternating current will flow through the field winding F, its value being determined by the inductive reactance of the winding F. When the A. C. voltage reverses and causes the anode of the tube to become positive, the tube 5 will conduct and produce a positive half-cycle pulse. The field current which started flowing towards the anode of the tube during the previous half-cycle, will also flow with the tube current. On the next phase reversal, the field current will increase, and will also increase on successive alternate half-cycles until the circulating current around through the tube 5 and the field winding F is equal to the peak value of the alternating current in the field winding as determined by the bias voltage at the grid 7 of the tube 5.

Figure 2:
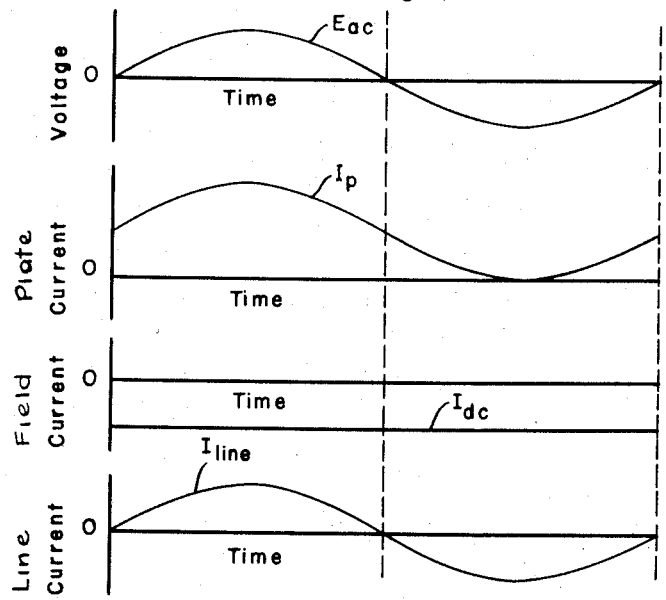
Fig. 2 is a plot of curves showing the voltages and currents in the circuit of Fig. 1.

The current and voltage relations in the circuit are shown by Fig. 2. A steady state D. C. is maintained by the large inductance of the field winding, while a displaced sine-wave D. C. is carried by the tube. The A. C. line current peak is equal to the D. C. in the field winding.

After the field current has increased to the value set by the tube resistance, the field current can be varied by changing the grid vias for thus varying the speed of the motor. Referring again to Fig. 1, decreasing the grid potential as by adjustment of the tap 8 will increase the tube resistance and reduce the field current. Increasing the grid potential will reduce the tube resistance and increase the field current. When the grid potential is reduced to the point that the tube is cut off, the D. C. component will become zero, and there will be a small alternating current in the field winding as a result of the relatively large field inductance. The source impedance 2 must be greater than the tube impedance for proper operation. If the source impedance is not great enough a separate impedance, as shown, must be added.

Figure 3:
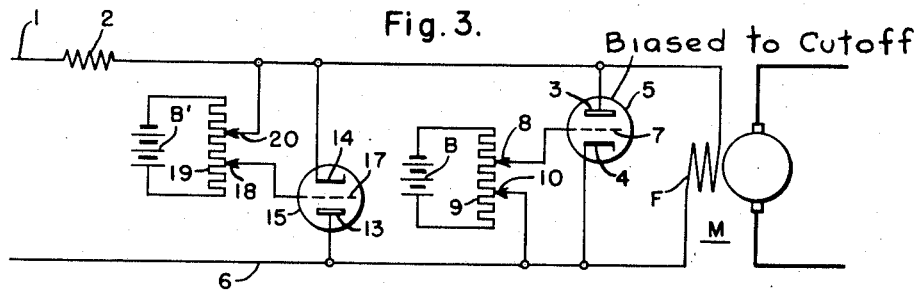
Fig. 3 is a diagrammatic showing of another embodiment of this invention.

The circuit of Fig. 3 includes the circuit of Fig. 1 and adds an additional tube 15 having its cathode 14 connected to the anode 3 of the tube 5, and having its anode 13 connected to the cathode 4 of the tube 5. The grid 17 of the tube 15 is connected to the brush or tap 18 of the potentiometer 19 which is shunted across the bias voltage battery B', and which has an intermediate tap 20 connected to the cathode 14 of the tube 15.

In the operation of the circuit of Fig. 3, only one of the tubes 5 or 15 would be operative at any one time. The bias voltage of the tube 15 would be adjusted to cut off the tube 15 when the tube 5 is operative to supply field current of one polarity for causing the motor M to rotate in one direction. The bias voltage of the tube 5 would be adjusted to cut the tube 5 off when the tube 15 is operative to supply field current of the opposite polarity for causing the motor M to rotate in the other direction.

The potentiometer 19 can be adjusted for varying the field current of the winding F when the tube 15 is operative.

While only two embodiments of the invention have been described for the purpose of illustration, it should be understood that the invention is not limited to the exact circuits and circuit components illustrated and described, as modifications thereof may be suggested by those skilled in the art, without departure from the essence of the invention.

I claim as my invention:

1. In an electric system of control, in combination, a highly inductive load unit having two input terminals, a first vacuum tube having an anode and a cathode, the anode being connected to the one input terminal and the cathode being connected to the other input terminal, a second vacuum tube having an anode and a cathode, the cathode being connected to the one input terminal and the anode being connected to the other input terminal, an impedance having an impedance value greater than the tube impedances of the respective tubes, a pair of supply conductors in use connected to a suitable source of alternating current, said impedance having two terminals, one, which may be designated the first impedance terminal, being connected to one of said supply conductors and the other, or second impedance terminal, being connected to one of said input terminals, the input terminal not connected to the second impedance terminal being connected to the other supply conductor, said vacuum tubes each having a control grid, and means for each of said grids for supplying selected bias voltages between said cathodes of the respective tubes and the respective control grids, whereby the highly inductive load is supplied with a direct current, as functions of the respective grid biases, of one direction or a reverse direction, depending upon which tube is biased to cut-off, from the supply conductors energized with alternating current.

2. In an electric system of control, in combination, a direct current motor having a highly inductive field winding which has two input terminals, a first vacuum tube having an anode and a cathode, the anode being connected to the one input terminal and the cathode being connected to the other input terminal, a second vacuum tube having an anode and a cathode, the cathode being connected to the one input terminal and the anode being connected to the other input terminal, an impedance having an impedance value greater than the tube impedances of the respective tubes, a pair of supply conductors in use connected to a suitable source of alternating current, said impedance having two terminals, one, which may be designated the first impedance terminal, being connected to one of said supply conductors and the other, or second impedance terminal, being connected to one of said input terminals, the input terminal not connected to the second impedance terminal being connected to the other supply conductor, said vacuum tubes each having a control grid, and means for each of said grids for supplying selected bias voltages between said cathodes of the respective tubes and the respective control grids, whereby the highly inductive field winding of the motor is supplied with a direct current, as functions of the respective grid biases, of one direction or a reverse direction, depending upon which tube is biased to cut-off, to effect forward or reverse operation of the motor, said current being supplied from the supply conductors which are energized with alternating current.

References Cited in the file of this patent

UNITED STATES PATENTS

| | | |
|---|---|---|
| 1,376,452 | Meyer | May 3, 1921 |
| 1,844,243 | Crout | Feb. 9, 1932 |
| 2,157,888 | Dawson | May 9, 1939 |
| 2,449,797 | Waldie | Sept. 21, 1948 |

FOREIGN PATENTS

| | | |
|---|---|---|
| 399,243 | Germany | Aug. 6, 1924 |